US008894242B2

United States Patent
Tada et al.

(10) Patent No.: US 8,894,242 B2
(45) Date of Patent: Nov. 25, 2014

(54) ELECTRONIC DEVICE CASING WITH A WATER INHIBITOR

(75) Inventors: Kazuhiro Tada, Kawasaki (JP); Yoshifumi Kajiwara, Sapporo (JP); Takashi Suzuki, Sapporo (JP); Hiroyuki Takita, Sapporo (JP); Hiroshi Kubo, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 129 days.

(21) Appl. No.: 13/426,858

(22) Filed: Mar. 22, 2012

(65) Prior Publication Data
US 2012/0275160 A1 Nov. 1, 2012

(30) Foreign Application Priority Data

Mar. 31, 2011 (JP) .................................. 2011-077400

(51) Int. Cl.
| | |
|---|---|
| *F21V 29/00* | (2006.01) |
| *H04M 1/22* | (2006.01) |
| *H04M 1/00* | (2006.01) |
| *H04M 1/18* | (2006.01) |
| *H04M 19/04* | (2006.01) |
| *F21V 8/00* | (2006.01) |

(52) U.S. Cl.
CPC .............. *H04M 19/048* (2013.01); *H04M 1/18* (2013.01); *H04M 1/22* (2013.01); *G02B 6/0016* (2013.01)
USPC ............................ 362/267; 362/88; 455/575.8

(58) Field of Classification Search
USPC ........... 362/158, 88, 267, 362, 253, 364, 372, 362/84; 345/169; 455/575.08, 575.1, 550.1, 455/575.8; 397/428.01; 277/644, 645; 235/472.01; 379/428.01
See application file for complete search history.

(56) References Cited

U.S. PATENT DOCUMENTS

| | | | | |
|---|---|---|---|---|
| 2,259,910 | A | * | 10/1941 | Rylsky ............................. 362/26 |
| 4,225,970 | A | * | 9/1980 | Jaramillo et al. ............. 455/90.3 |
| 5,083,240 | A | * | 1/1992 | Pasco ............................... 362/26 |
| 5,175,873 | A | * | 12/1992 | Goldenberg et al. ......... 455/351 |
| 6,215,602 | B1 | | 4/2001 | Kubo et al. |
| 6,983,130 | B2 | * | 1/2006 | Chien et al. ................... 455/90.3 |
| 7,249,861 | B2 | * | 7/2007 | Coleman et al. ................ 362/24 |
| 8,032,194 | B2 | * | 10/2011 | Liu et al. ..................... 455/575.8 |
| 8,090,124 | B2 | * | 1/2012 | Nakagawa ..................... 381/152 |
| 8,155,717 | B1 | * | 4/2012 | Watson ....................... 455/575.3 |
| 8,243,458 | B2 | * | 8/2012 | Chen et al. ..................... 361/752 |
| 8,315,051 | B2 | * | 11/2012 | Kim et al. ................. 361/679.56 |

(Continued)

FOREIGN PATENT DOCUMENTS

| | | | |
|---|---|---|---|
| JP | 2000-196719 A | 7/2000 | |
| WO | WO 2011008026 A2 | * 1/2011 | ................ G06F 3/02 |

*Primary Examiner* — Peggy Neils
*Assistant Examiner* — Erin Kryukova
(74) *Attorney, Agent, or Firm* — Maschoff Brennan

(57) ABSTRACT

An electronic apparatus includes a light source; a casing that accommodates the light source and includes a first window transmitting light from the light source; a water inhibitor that is formed from a circumferential wall and a window seal in a monoblock form, the circumferential wall being disposed along a inner circumference of the casing and preventing invasion of water from the circumference of the casing into the casing, the window seal being disposed inside the first window and preventing invasion of water from the first window into the casing, the water inhibitor preventing invasion of water into the casing and transmitting the light from the first window to a outside of the casing; and a light guide member that is disposed over the first window and guides the light transmitted through the first window.

6 Claims, 15 Drawing Sheets

(56) References Cited

U.S. PATENT DOCUMENTS

| | | | |
|---|---|---|---|
| 8,456,847 B2 * | 6/2013 | Hwang et al. | 361/730 |
| 8,599,547 B2 * | 12/2013 | Richardson et al. | 361/679.3 |
| 2008/0070638 A1 * | 3/2008 | Higashiyama | 455/566 |
| 2008/0081679 A1 * | 4/2008 | Kawasaki et al. | 455/575.8 |
| 2008/0146296 A1 * | 6/2008 | Sakashita et al. | 455/575.3 |
| 2008/0242384 A1 * | 10/2008 | Hsu et al. | 455/575.8 |
| 2009/0270135 A1 * | 10/2009 | Shoji et al. | 455/566 |
| 2010/0110653 A1 * | 5/2010 | Hisada | 361/810 |
| 2011/0157800 A1 * | 6/2011 | Richardson et al. | 361/679.01 |
| 2012/0113012 A1 * | 5/2012 | Cho et al. | 345/169 |

* cited by examiner

ELECTRONIC DEVICE CASING WITH A WATER INHIBITOR

CROSS-REFERENCE TO RELATED APPLICATION

This application is based upon and claims the benefit of priority of the prior Japanese Patent Application No. 2011-077400, filed on Mar. 31, 2011, the entire contents of which are incorporated herein by reference.

FIELD

The embodiments discussed herein are related to an electronic apparatus including an illumination structure.

BACKGROUND

In the past, there have been electronic apparatuses, such as mobile phones, capable of illumination part of the casing or display in response to incoming notices and e-mail reception alerts, and the execution of other applications.

Japanese Laid-open Patent Publication No. 2000-196719 describes an illumination display structure including depressions that latch on to a panel on part of a casing, and including a lens that guides light emitted from a light-emitting body in response to an incoming call is interposed between the casing and the panel.

With known electronic equipment, an exterior casing is made of colored resin, which hardly transmits light. Hence, the light may be transmitted through part of a liquid crystal display (LCD). In such case, the area transmitting light is limited, and the visibility of the transmitted light is reduced by the light emitted from the LCD.

When a light-emitting unit is disposed on the casing, it is difficult to additionally provide, for example, an illumination holder that protects the light-emitting unit and guides light in a specific direction and a structure for illuminating a large area of the casing, because the size of mobile phones is reduced. To attach a new component to the casing, water-inhibiting is desirably provided in the area where the component is attached to the casing. There is usually, however, not enough space for attaching such a water-inhibiting component.

SUMMARY

According to an aspect of the invention, an electronic apparatus includes: a light source; a casing that accommodates the light source and includes a first window transmitting light from the light source; a water inhibitor that is formed from a circumferential wall and a window seal in a monoblock form, the circumferential wall being disposed along a inner circumference of the casing and preventing invasion of water from the circumference of the casing into the casing, the window seal being disposed inside the first window and preventing invasion of water from the first window into the casing, the water inhibitor preventing invasion of water into the casing and transmitting the light from the first window to a outside of the casing; and a light guide member that is disposed over the first window and guides the light transmitted through the first window.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

First Embodiment

Figure 1:
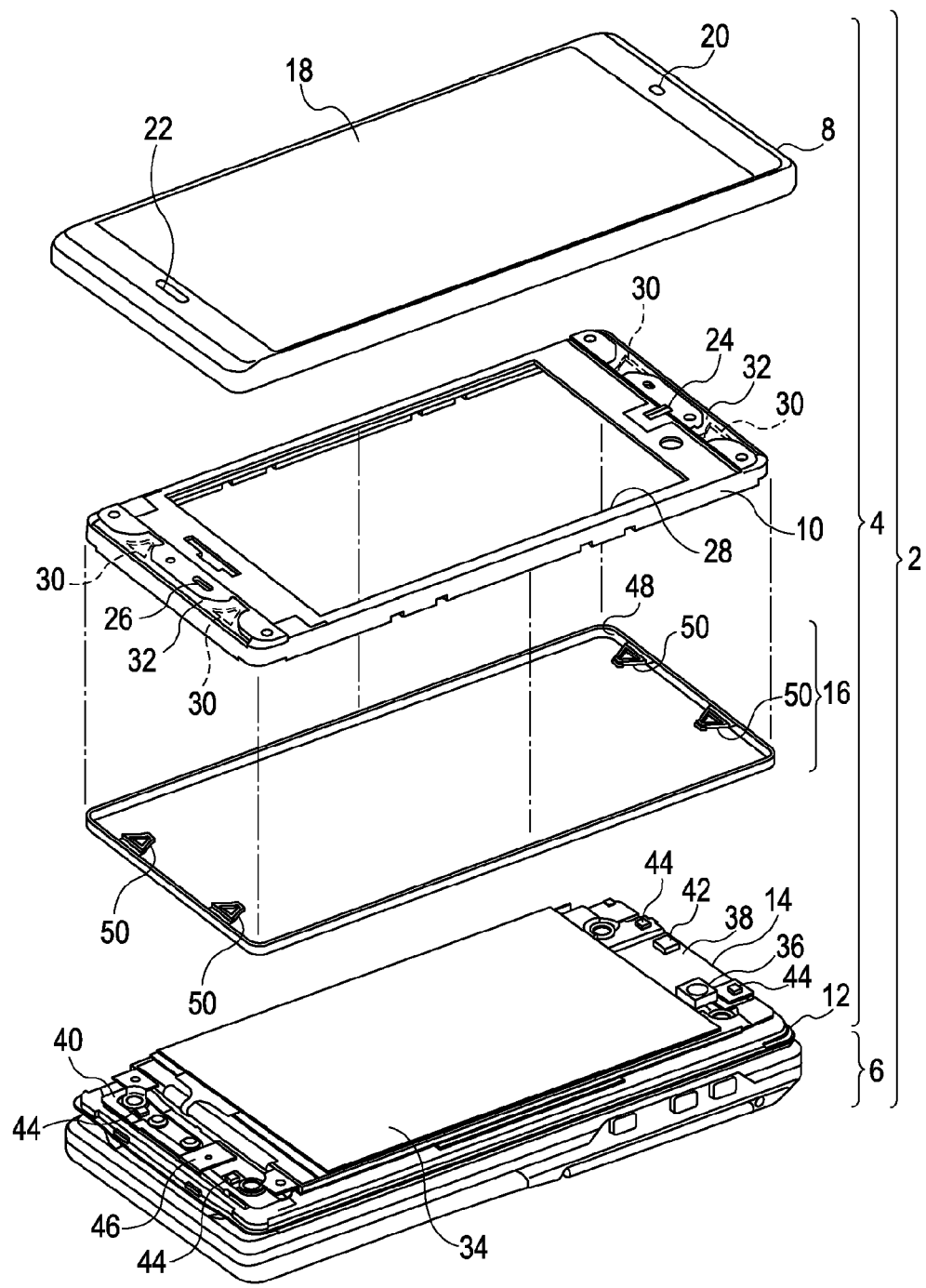
FIG. 1 illustrates an example configuration of a mobile phone according to a first embodiment.
Figure 2:
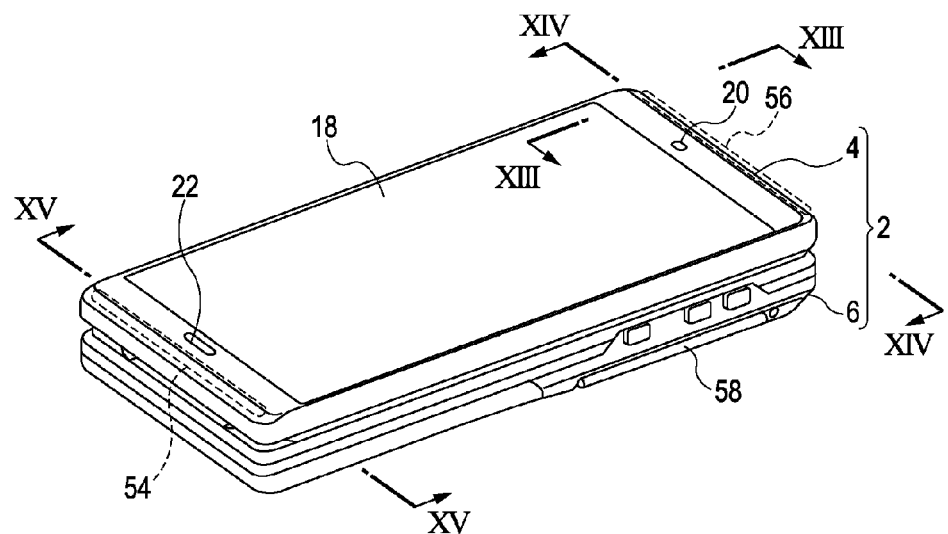
FIG. 2 illustrates an example external configuration of the mobile phone.

A first embodiment will be described with reference to FIGS. 1 and 2. FIG. 1 illustrates an example configuration of a mobile phone 2 according to the first embodiment. FIG. 2 illustrates an example external configuration of the mobile phone 2. The configurations illustrated in FIGS. 1 and 2 are merely examples and are not limited thereto.

The mobile phone 2 is an example of an electronic apparatus according to the present embodiment and includes a first casing 4 and a second casing 6. The casing 4 is stacked on the casing 6 in such a manner that the casing 4 slides in the longitudinal direction with respect to the casing 6. The casing 4 mainly constitutes a display functional unit, and the casing 6 mainly constitutes an operation functional unit.

The casing 4 is a movable casing, which slides with respect to the casing 6. The casing 4 includes a front cover 8, a movable front case 10, a movable rear case 12, and a substrate 14. The substrate 14 is interposed between the movable front case 10 and the movable rear case 12. An elastomer 16 is disposed on the inner side of the movable front case 10. The front cover 8, the movable front case 10, the movable rear case 12, etc. are, for example, resin moldings. The casing 4 is electrically connected to the casing 6 via a cable.

The front cover 8 is an example of a cover member of the casing 4 according to the present embodiment, constitutes an external component of the casing 4 of the mobile phone 2, and is, for example, made of a light-transmissive material. The front cover 8 includes a display window 18 through which a screen of a liquid crystal display panel 34 disposed on the movable rear case 12 is displayed. For example, a touch panel module may be installed so that the display window 18 functions as an operation input unit. A sound emitting hole 20 and a sound intake hole 22, which are used for making a call on the mobile phone 2, are formed at the front and rear end sections in the longitudinal direction of the front cover 8.

The front or back side of the front cover 8 provides color to the mobile phone 2 by, for example, being made of a colored material or by including a colored member attached thereto. The colored material or colored member is capable of blocking or attenuating light, prohibiting the emission of light guided from the inside of the casing 4 to the outside. As described below, an illumination window, through which light guided from the inside of the casing 4 is emitted to the outside thereof, is formed on at least part of the front cover 8.

The movable front case 10 is an example of a member of the casing 4 according the present embodiment. The movable front case 10 may includes a sound emitting hole 24 and a sound intake hole 26. Sound generated by a receiver 42 on the substrate 14 is transmitted through the sound emitting hole 24 and is emitted from the sound emitting hole 20 of the front cover 8. Sound from the sound intake hole 22 of the front cover 8 is transmitted through the sound intake hole 26 and is taken in by a microphone 46 on the substrate 14.

The movable front case 10 includes a display window 28 through which the screen of the liquid crystal display panel 34 on the substrate 14 is displayed. At least one window 30 is formed at each of the front and end sections in the longitudinal direction of the movable front case 10. And a light-guide member 32 designed to covers the windows 30 is disposed on the movable front case 10. The movable front case 10 surrounds a light-source disposed at the front side of the substrate 14 from above, and transmits light from the light-source through the windows 30. The light transmitted through the windows 30 is guided toward the front cover 8 by the light-guide member 32. The light-guide member 32 is an example of a light-emitting member, which emits light to the exterior thereof by light diffusion and is, for example, an acrylic plate. In addition to an acrylic material, other light-guiding materials such as synthetic resin and glass may be used.

The movable rear case 12 holds the substrate 14 placed thereon and is joined with the movable front case 10 to constitute the casing 4. The movable rear case 12 includes a slide guide (not shown), which slides the casing 4 with respect to the casing 6, and a cable through-hole through which a cable electrically connecting the casing 4 and with the casing 6 is passed.

The movable front case 10 includes latching hooks for joining the movable rear case 12. The movable rear case 12 includes latching units for holding the substrate 14 and latching hooks for latching to the movable front case 10.

The substrate 14 is an example of a functional component installed in the casing 4, and at least one functional component are mounted on the substrate 14. A liquid crystal display panel 34, a camera 36, and an antenna functional component are mounted on the substrate 14, and flexible substrates 38 and 40 are mounted on the substrate 14 at the side of the front and back end sections of the liquid crystal display panel 34. The substrate 14 includes through-holes at the ends sections in the longitudinal direction; fixing components, such as screws and bolts, are passed through the through-holes to secure the substrate 14 to the movable rear case 12 with the flexible substrates 38 and 40 interposed therebetween.

The flexible substrate 38 contains a flat flexible wire conductor in a resin film, and is an example of a circuit unit or flexible substrate disposed on the top side of the casing 4. The receiver 42, which emits sound during a call, and light emitting diodes (LEDs) 44, which is an example of the light source of the invention and illuminate the front surface of the mobile phone 2, are mounted on the flexible substrate 38.

The flexible substrate 40 is an example circuit unit or flexible substrate in the casing 4, and is disposed inside a space formed between the bottom end section of the casing 4 and the liquid crystal display panel 34. The flexible substrates 38 and 40 include flexible flat wire conductors in a resin film, and are deformable, e.g., bendable. The LED 44, the microphone 46, and other antennas, etc. are mounted on the flexible substrate 40.

The elastomer 16 is an example water inhibitor used inside the casing 4 and prevents invasion of water into the casing 4. The elastomer 16 is disposed at the inner circumference of the casing 4 and on the side of the windows 30 formed in the movable front case 10. The elastomer 16 includes a circumferential wall 48 that follows the circumference of the movable front case 10 and window seal 50 that are inserted into the windows 30 in the movable front case 10 to provide sealing. The elastomer 16 is made of a thermoplastic and light transmissive resin material, such as polyester, and transmits the light emitted from the LEDs 44. The elastomer 16 may be colored as needed.

In the mobile phone 2 illustrated in FIG. 2, the casing 4 is stacked on top of the casing 6 such that the upper side of the casing 6 is covered with the casing 4 when in a closed state to inhibit contact operation. For example, the communication function and the display function, such as web browsing and email transmission, of the mobile phone 2 can be used even in a closed state. The mobile phone 2 can be operated through the touch panel mounted in the display window 18. Illumination windows 54 and 56 are formed in the front cover 8 (FIG. 1) at the end section of the casing 4. The illumination windows 54 and 56 are illuminated to notify incoming calls, start-up of the mobile phone 2, reception of emails, etc. or to provide illumination.

To use the input operation function of the mobile phone 2, the casing 4 is slid in the longitudinal direction to expose the upper side of the casing 6. The casing 6 is an example of an operated case of the mobile phone 2, and is a fixed case with respect to the casing 4, which is slidable. The casing 6 includes a keypad, which includes ten keys, an enter key, and a cursor key, etc. An antenna 58 that transmits and receives radio signals, for example, television broadcasting signals and data signals is disposed on the side surface of an end section of the casing 6. In addition, in the mobile phone 2 the casing 4 may be slid in the longitudinal direction with respect to the casing 6 and then slid in the left-to-right direction to display a horizontally long screen for viewing television broadcasting, etc.

Figure 3:
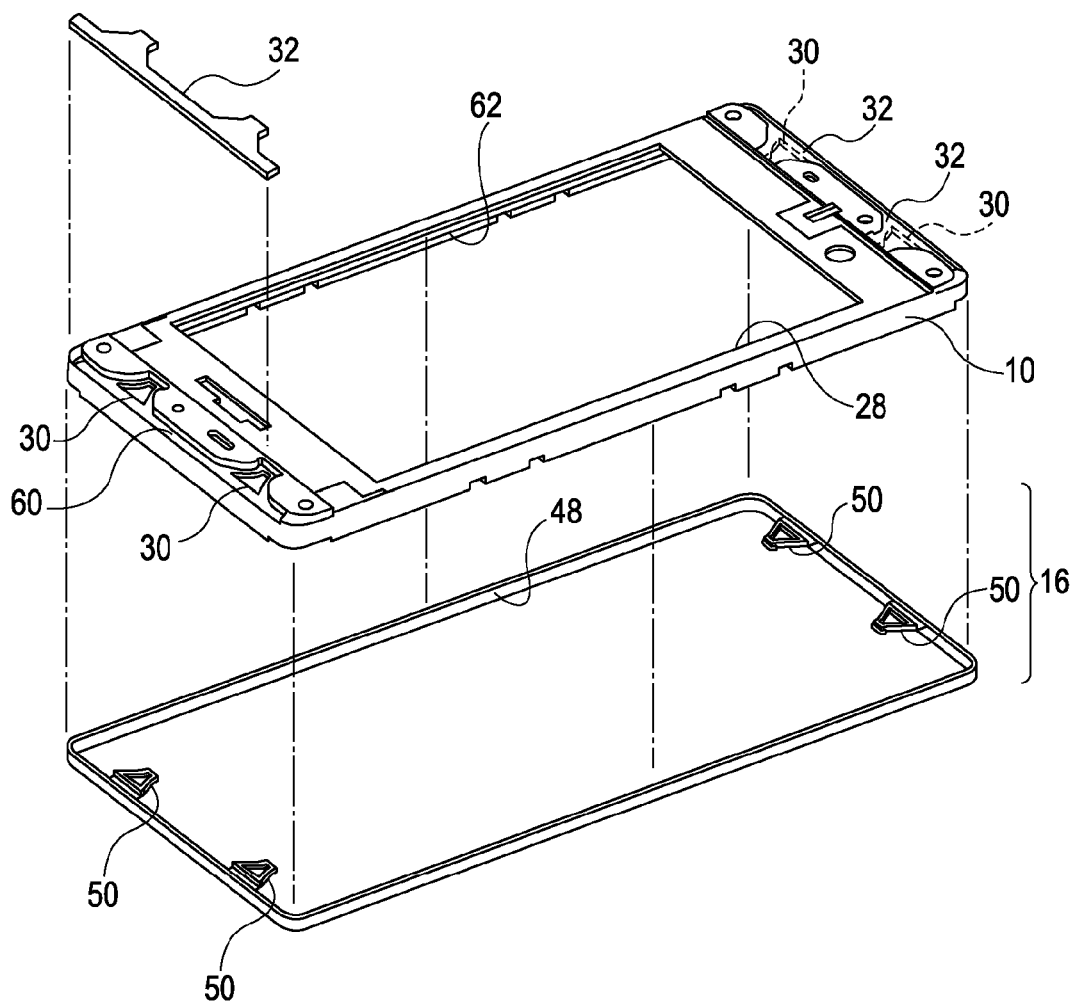
FIG. 3 illustrates an example configuration of a movable front case and components mounted thereon.
Figure 4:
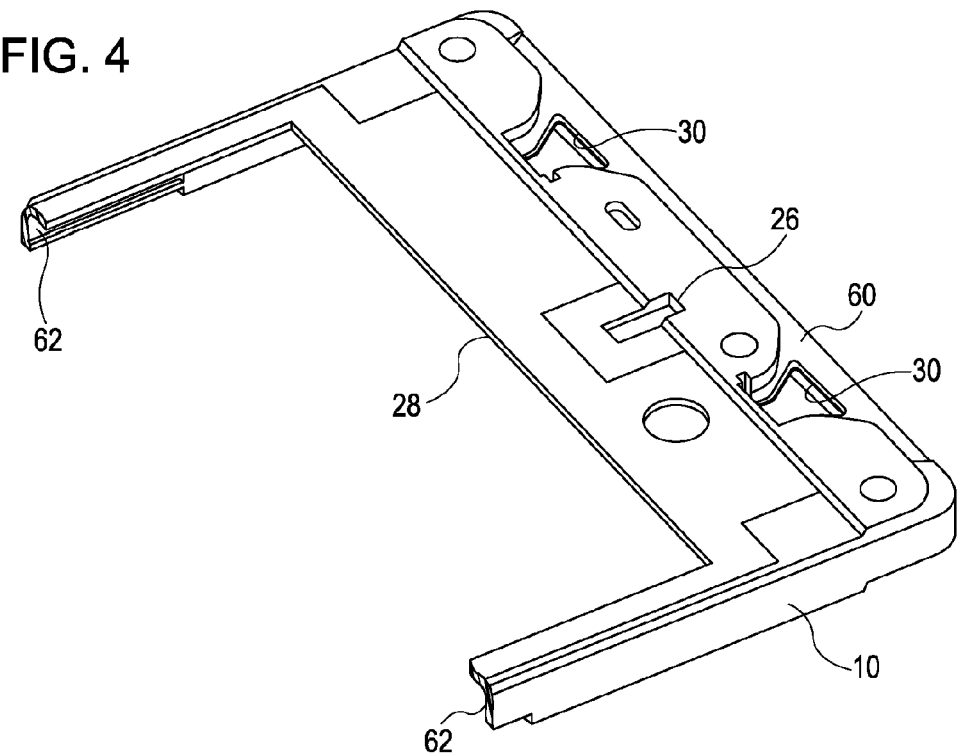
FIG. 4 illustrates an example configuration of the movable front case.

The configuration of the movable front case 10 will be described below with reference to FIGS. 3 and 4. FIG. 3 illustrates an example configuration of the movable front case 10 and components mounted thereon. FIG. 4 illustrates an example configuration of the movable front case 10. The configurations illustrated in FIGS. 3 and 4 are merely examples and are not limited thereto.

Grooves 60 are formed at front and back ends in the longitudinal direction of the movable front case 10, as illustrated in FIG. 3, and light guide members 32 are disposed in the grooves 60. The light guide members 32 are shaped so that they can be accommodated in the grooves 60 and are, for example, in tight contact with the grooves 60 so that gaps and depressions are not formed.

So long as the light guide members 32 can be accommodated in the grooves 60, the size of the light guide members 32 may be arbitrarily set in accordance with the area to which light is to be guided.

As illustrated in FIG. 4, each groove 60 includes windows 30, which transmit light emitted from the inside of the casing 4 therethrough, and a peripheral component. The groove 60 is formed at the end section of the movable front case 10 and as a straight line in the lateral direction. In this way, the groove 60 connects the plurality of windows 30.

A water resistant groove 62 is formed around the back side of the movable front case 10. The water resistant groove 62 accommodates and retains the elastomer 16.

Figure 5:
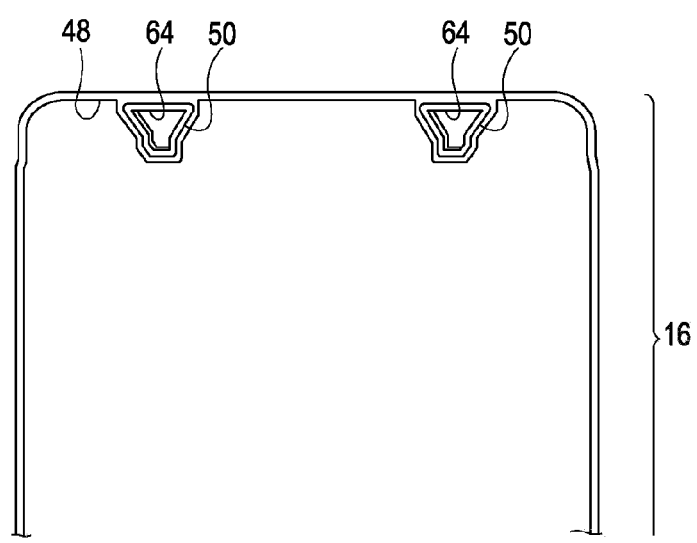
FIG. 5 illustrates an example configuration of the front side of an elastomer.
Figure 6:
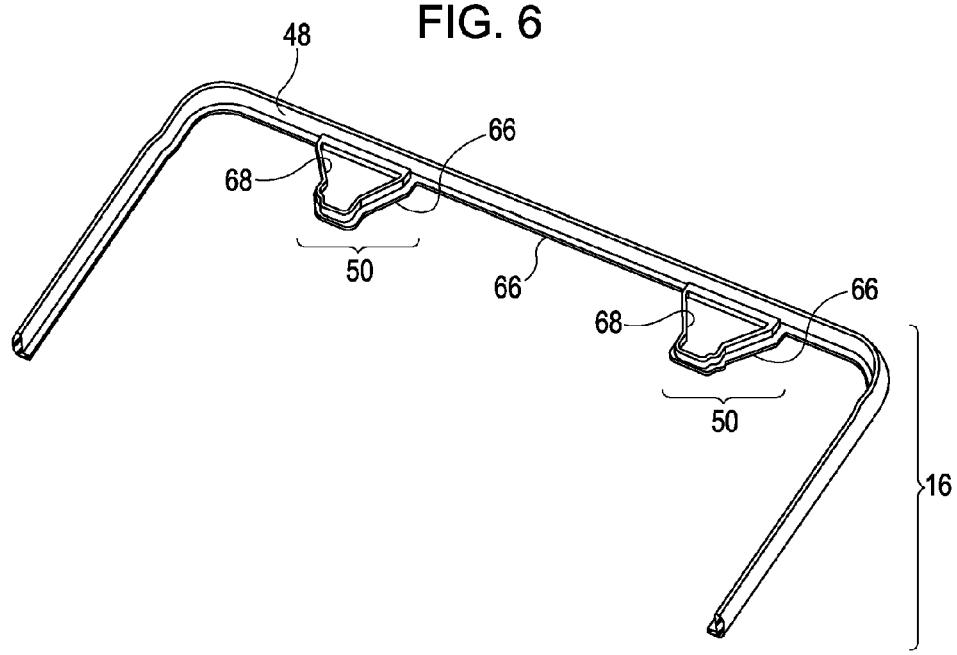
FIG. 6 illustrates an example configuration of the back side of the elastomer.
Figure 7:
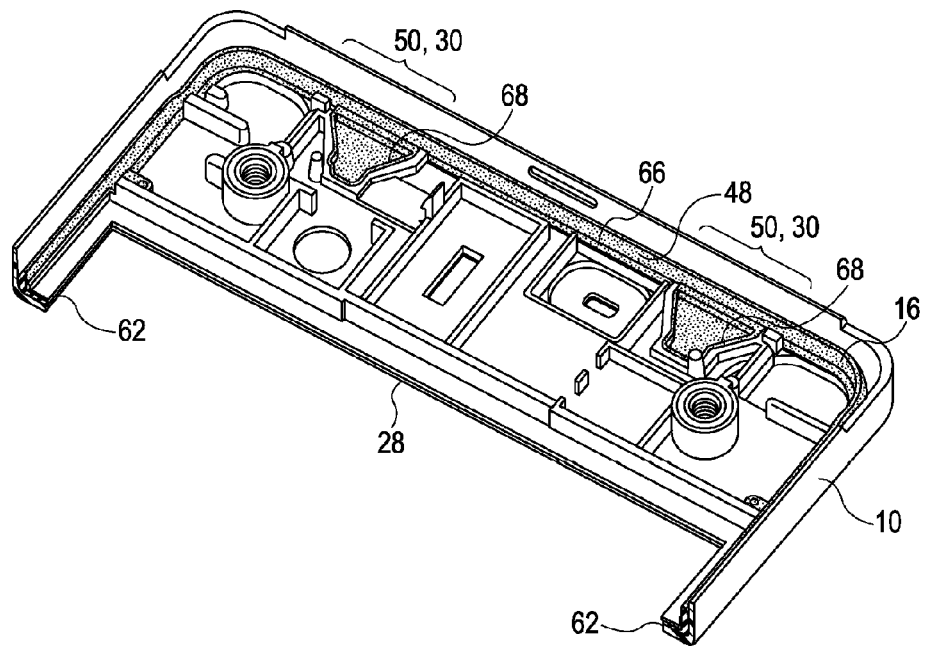
FIG. 7 illustrates an example configuration of the elastomer mounted on the movable front case.

An example configuration of a water resistant unit will be described with reference to FIGS. 5, 6, and 7. FIG. 5 illustrates an example configuration of the front side of the elastomer 16. FIG. 6 illustrates an example configuration of the back side of the elastomer 16. FIG. 7 illustrates an example configuration of the elastomer 16 mounted on the movable front case 10. The configurations illustrated in FIGS. 5 to 7 are merely examples and are not limited thereto.

The elastomer 16 illustrated in FIG. 5 includes, in addition to the circumferential wall 48, the window seal 50 that match the windows 30 in the movable front case 10. The circumferential wall 48 and the window seal 50 may be integrated into a single unit. Each window seal 50 has the same height as the groove 60 in the movable front case 10 or protrudes from the groove 60 when the window seal 50 is inserted into the corresponding window 30. The front side of the window seal 50 includes a depression 64 at the center to, for example, avoid contact with the light guide members 32.

As illustrated in FIG. 6, the circumferential wall 48 and the window seal 50 include sealing ribs 66 on the back side of the elastomer 16, and the sealing ribs 66 contact the back side of the movable front case 10. Each window seal 50 includes a depression 68 at the center thereof so that the corresponding LED 44 does not contact the window seal 50.

As illustrated in FIG. 7, by disposing the circumferential wall 48 of the elastomer 16 in the water resistant groove 62 of the movable front case 10, the sealing ribs 66 are disposed in contact with the back side of the movable front case 10, and the circumferential wall 48 is disposed on the sidewall of the movable front case 10. In this state, the window seal 50 are inserted into the corresponding windows 30. As described below, the windows 30 are formed directly above the light sources, e.g., LEDs 44, and the periphery thereof. Thus, the circumferential wall 48 of the elastomer 16, the window seal 50 disposed in the windows 30, and the movable front case 10 constitute illumination holders for containing the LEDs 44.

Figure 8:
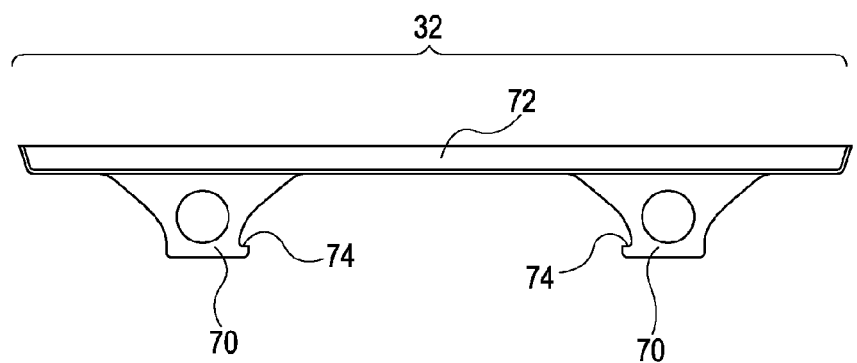
FIG. 8 illustrates an example external configuration of the front side of a light guide member.
Figure 9:
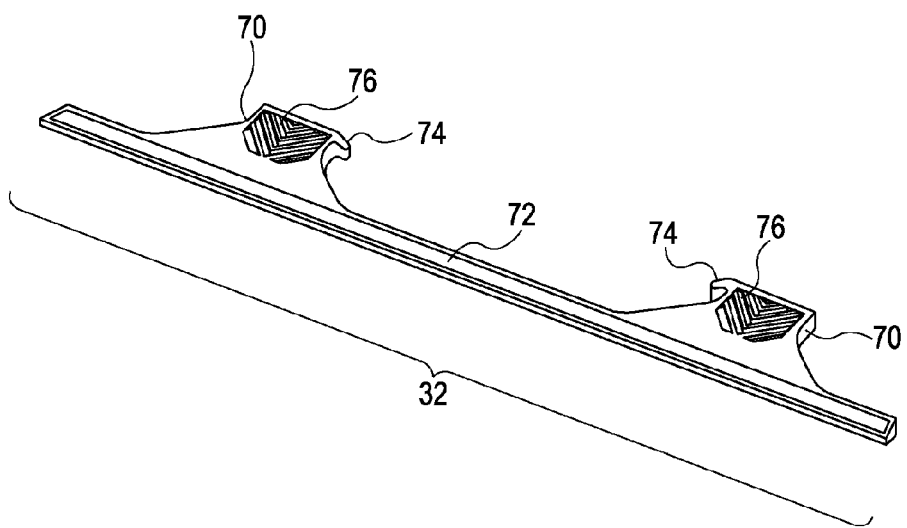
FIG. 9 illustrates an example configuration of the back side of the light guide member.
Figure 10:
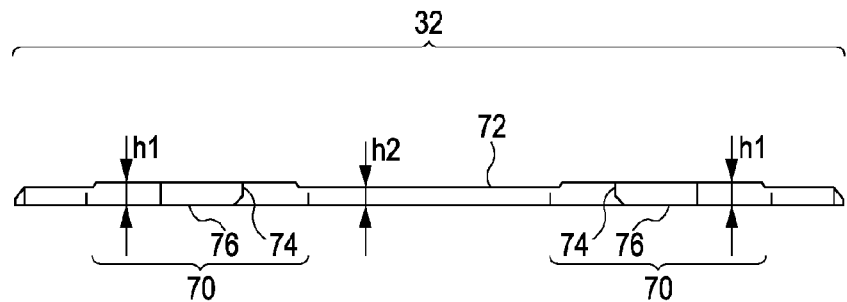
FIG. 10 illustrates an example back-side configuration of the light guide member.
Figure 11:
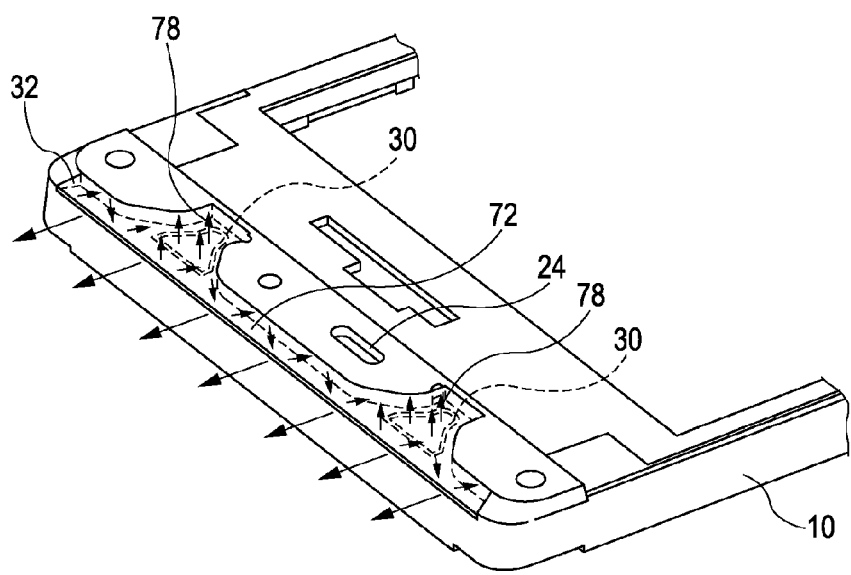
FIG. 11 illustrates examples of light guiding and an illumination state.

The configuration of each light guide member 32 will be described with reference to FIGS. 8, 9, 10, and 11. FIG. 8 illustrates an example external configuration of the front side of the light guide member 32. FIG. 9 illustrates an example configuration of the back side of the light guide member 32. FIG. 10 illustrates an example back-side configuration of the light guide member 32. FIG. 11 illustrates examples of the light guiding and the illumination state. The configurations illustrated in FIGS. 8 to 11 are merely examples and are not limited thereto.

The light guide member 32, for example, matches the shape of the corresponding groove 60 in the movable front case 10 and can be mounted therein. The light guide member 32 includes intake parts 70 through which light transmitted through the windows 30 is taken in and an illumination part 72. Each intake part 70 is disposed above the corresponding window 30 to take in light. The light guide member 32 disposed on the periphery of the window 30 guides the intake light toward the illumination part 72 by reflecting and diffusing the intake light. The illumination part 72 receives the light guided from the intake parts 70, and emits the light at the outside of the light guide member 32 through the illumination part 72 to illuminate the surface thereof. The light guide member 32 may take in and guide light from a plurality of intake parts 70.

In addition, a latching hook 74 is formed on the part of the rear section of each intake part 70, and latches together with the movable front case 10 in order to inhibits movement and detachment of the light guide member 32 in the groove 60.

As illustrated in FIG. 9, in the light guide member 32, an oblique-light diffusing part 76 is formed on at least part of the back side of each intake part 70. The oblique-light diffusing part 76 is disposed on the incident surface of light from the window 30 so to face the corresponding window 30, and deflects the incident light into oblique direction to the incident light. The oblique-light diffusing part 76 includes protrusions and depressions formed of grooves with a V-shaped cross-section provided at predetermined intervals toward the illumination part 72. The oblique-light diffusing part 76 changes the angle of the light taken into the intake part 70 by, for example, letting the light from the window 30 to be incident on the grooves. In this way, the oblique-light diffusing part 76, for example, deflects the incident light on the intake part 70 perpendicularly or almost perpendicularly into oblique light, which can be diffused and reflected in the intake part 70, to expand the illuminated area and to increase the amount of illumination light.

As illustrated in FIG. 10, the height of the light guide member 32 gradually increases from the illumination parts 72 with a height $h_2$ toward the intake parts 70 with a height of $h_1$. The level of the bottom surface of the light guide member 32 is, for example, uniform from the intake parts 70 to the illumination part 72 so that a gap is not formed at the mounting part between the movable front case 10 and the light guide member 32. In this way, light does not leak from the light guide member 32 in unwanted directions.

The light guide member 32 is fit together with the groove 60 formed in the movable front case 10, which is illustrated in FIG. 11. The light 78 transmitted through the windows 30 is reflected and diffused in the illumination part 72 and is guided through the entire light guide member 32. Then, the light 78 is externally emitted from the end section of the movable front case 10 where the illumination part 72 of the light guide member 32 is disposed.

Figure 12:
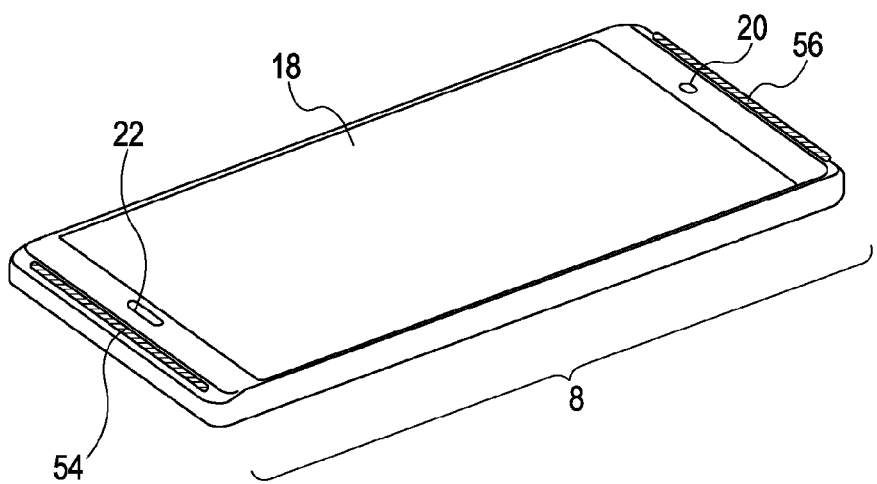
FIG. 12 illustrates an example external configuration of a front cover.

The configuration of the front cover 8 will be described with reference to FIG. 12. FIG. 12 illustrates an example external configuration of the front cover 8. The configuration illustrated in FIG. 12 is merely an example and is not limited thereto.

The illumination part 72 of the light guide member 32 is disposed in each of the illumination windows 54 and 56 in the front cover 8 and diffuses the emitted light to outside the front cover 8. The illumination windows 54 and 56 are constituted of colored or uncolored members disposed on the front cover 8. In this way, the illumination windows 54 and 56 can emit light.

Figure 13:
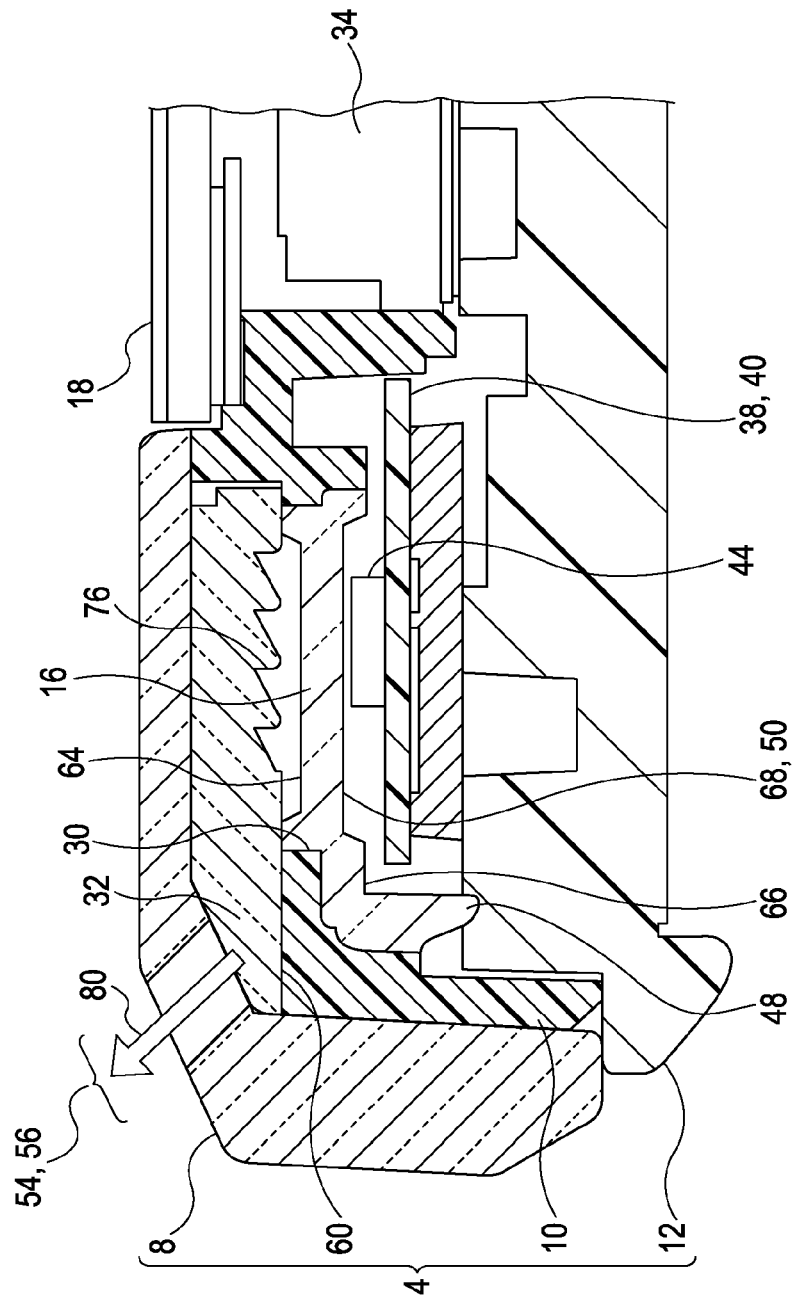
FIG. 13 is a sectional view of one of the LEDs 44 and the periphery thereof taken along line XIII-XIII in FIG. 2.
Figure 14:
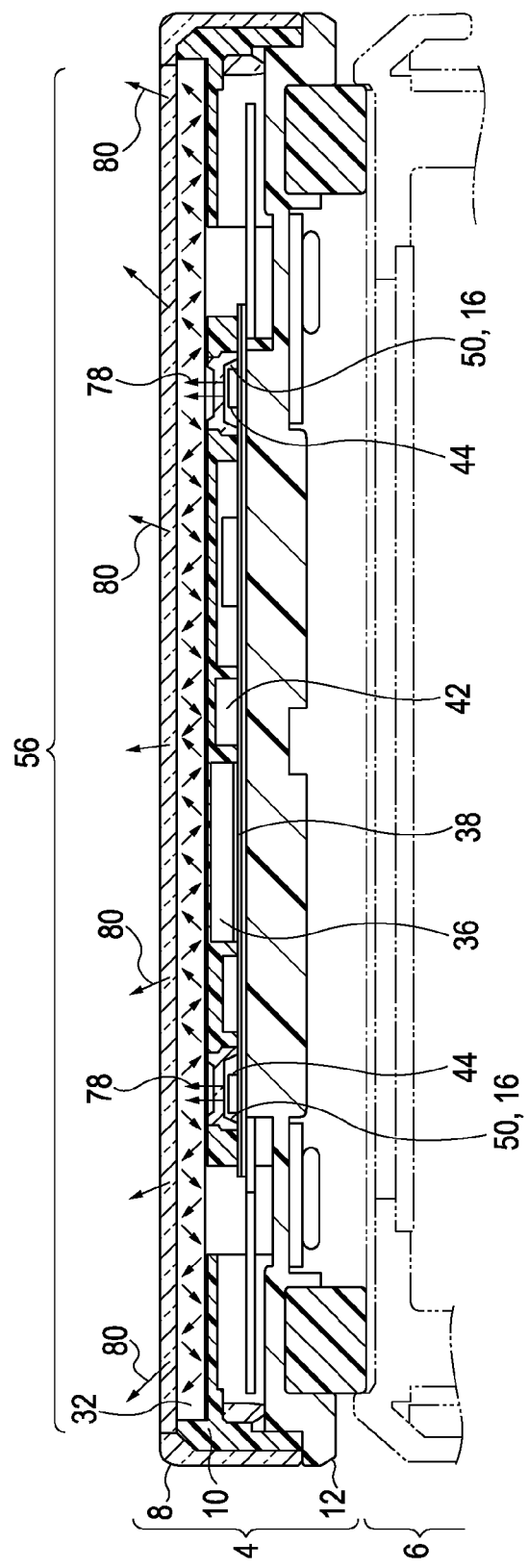
FIG. 14 is a sectional view taken along line XIV-XIV in FIG. 2.
Figure 15:
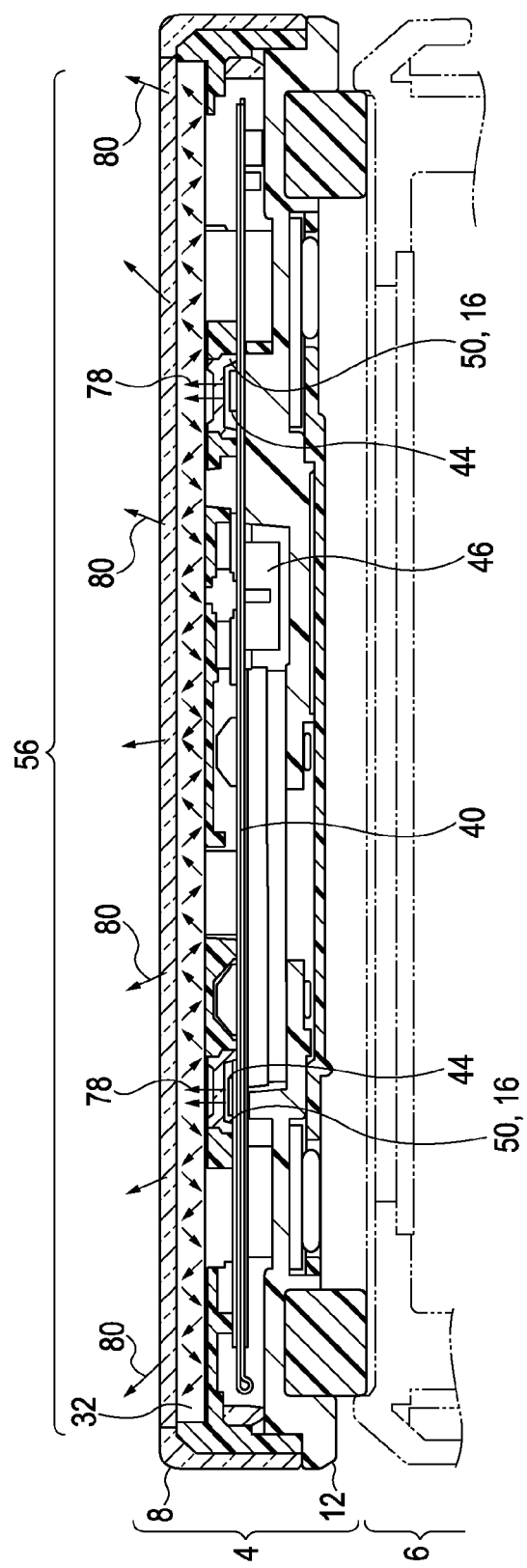
FIG. 15 is a sectional view taken along line XV-XV in FIG. 2.

The configuration of the casing 4 will be described below with reference to FIGS. 13, 14, and 15. FIG. 13 is a sectional view of one of the LEDs 44 and the periphery thereof taken along line XIII-XIII in FIG. 2. FIG. 14 is a sectional view taken along line XIV-XIV in FIG. 2. FIG. 15 is a sectional view taken along line XV-XV in FIG. 2. The configurations illustrated in FIGS. 13 to 15 are merely examples and are not limited thereto.

When the movable front case 10 including the elastomer 16 is disposed on the movable rear case 12, the windows 30 in the movable front case 10 are disposed at positions corresponding to the LEDs 44 mounted on the flexible substrates 38 and 40. As described above, the window seal 50, which are part of the elastomer 16, are disposed in the corresponding windows 30 and are disposed above the top surface of the LED 44. Each of the window seal 50 is integrated with the circumferential wall 48, which prevents invasion of water from the joining part of the movable front case 10 and the movable rear case 12 into the casing. The window seal 50 is in tight contact with the movable front case 10 in the near position to the liquid crystal display panel 34, which is mounted on the casing 4.

The depression 68 in formed in the window seal 50 to cover the LED 44. In this way, the movable front case 10 and the window seal 50 function as an illumination holder of the LED 44.

The circumferential wall 48 of the elastomer 16 is in tight contact with the movable front case 10, and at least part of the edge section of the circumferential wall 48 protrudes from the movable front case 10. The edge section of the circumferential wall 48 tightly contacts the movable rear case 12 by, for example, pressure bonding or by being inserted and secured in the groove formed in the movable rear case 12. In this way, since the circumferential wall 48 of the elastomer 16 is firmly secured to the joining part of the movable front case 10 and the movable rear case 12, the inside of the casing 4 is prevented invasion of water, and the water resistant ability is improved.

The window seal 50 of the elastomer 16 is pressure bonded to the inside of the corresponding window 30 or is tightly sealed with an adhesive, etc., and the sealing rib 66 covers the circumference of the window 30. In this way, water, etc. that enters between the movable front case 10 and the light guide member 32 can be stopped by the window 30, improving the water resistant ability of the mobile phone 2.

The depression 64 in the elastomer 16, which is illustrated in FIG. 13, provides a space between the light guide member 32 disposed in the groove 60 in the movable front case 10 and the elastomer 16 to be disposed apart from each other. In this way, the oblique-light diffusing part 76, which is provided on the light guide member 32, does not contact the elastomer 16 and deform. Thus, the transmitting angle of the incoming light from the LEDs 44 does not change. Moreover, the oblique-light diffusing part 76 and the depression 64 are not damaged.

As illustrated in FIG. 14, when the LEDs 44 mounted on the flexible substrate 38 on the receiver 42 side of the casing 4 emits light, the light 78 is transmitted through the window seal 50 of the elastomer 16 and is guided through the light guide member 32 by being reflected and diffused. The light guide member 32 has a longer side disposed along in the lateral direction of the casing 4 and connects two LEDs 44. In this way, the light 78 emitted from the LEDs 44 is guided through the light guide member 32 and light 80 is externally emitted from the casing 4 through the illumination window 56 in the front cover 8.

In this way, by guiding the light 78, which was emitted from a small number of light emitting units, to a large area of the casing 4, the illuminated area can be increased. Since the light guide member 32 connects the LEDs 44, the emitted light can be shaped, for example, as a line shape, to illuminate a large area of the casing 4 for improving the visibility of users.

The receiver 42, the camera 36, and many other components are accommodated in the casing 4. However, as described above, even when a small number of light emitting units is disposed, the light can be guided to desired positions through the light guide member 32 disposed on the outside of the movable front case 10. Thus, the components of the mobile phone 2 can be efficiently installed.

Similar to the receiver 42 side, on the microphone 46 side of the first casing 4, which is illustrated in FIG. 15, the light 78 emitted from the LEDs 44 on the flexible substrate 40 are guided such that the light 80 is emitted from the illumination window 54 in the front cover 8. In this way, a large area at the lateral side of the casing 4 can be illuminated.

According to the configuration described above, by using part of the elastomer 16 as a light transmitting unit, light from a light source can be guided to the side of the light guiding unit while maintain the water resistant ability. As a result, the water resistant structure of the casing 4 and installation structure of the display unit are simplified. By constituting an illumination holder that surrounds the light source with the casing 4 and the elastomer 16 of the mobile phone 2, the number of components in the light emitting unit can be reduced. By guiding light to the outside of the movable front case 10, a large area can be illuminated without affecting the mounting space for the functional components inside the casing 4 to improve the visibility of the light, and thus, the usefulness of the mobile phone 2 is increased.

Second Embodiment

Figure 16:
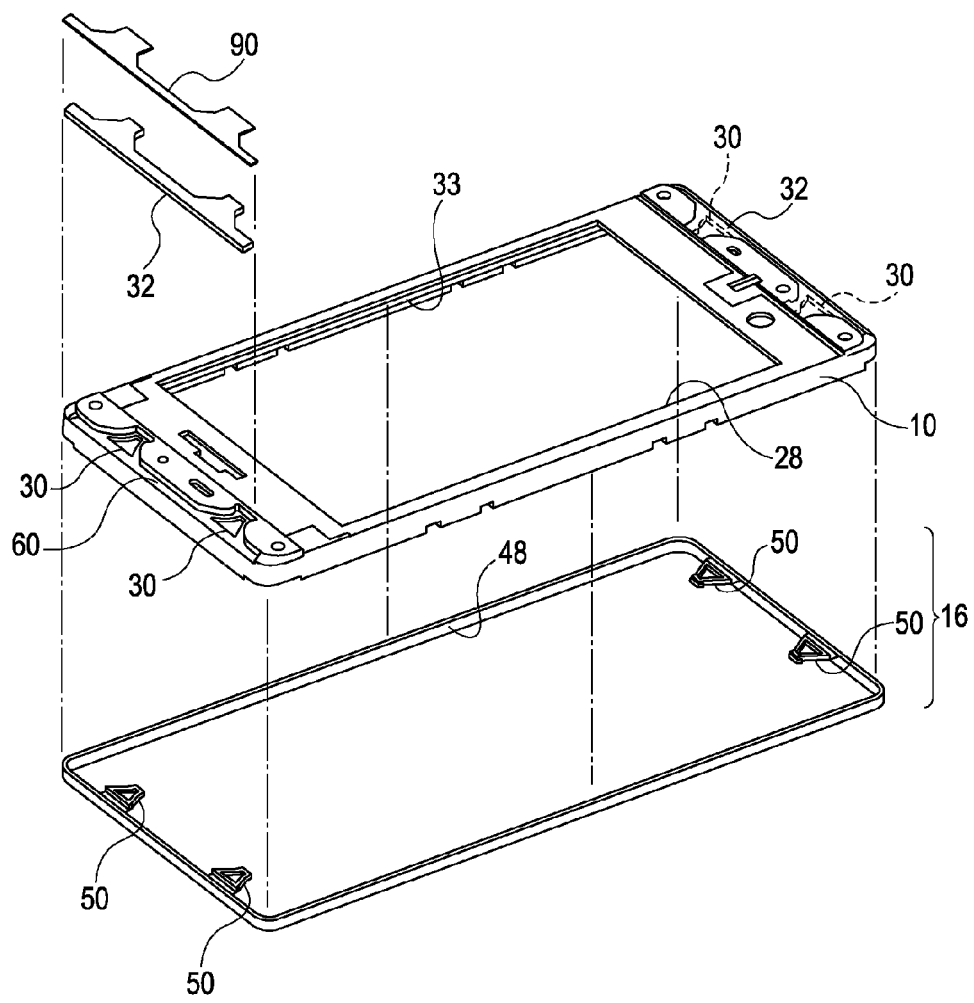
FIG. 16 illustrates an example configuration of a movable front case and peripheral components according to a second embodiment.
Figure 17:
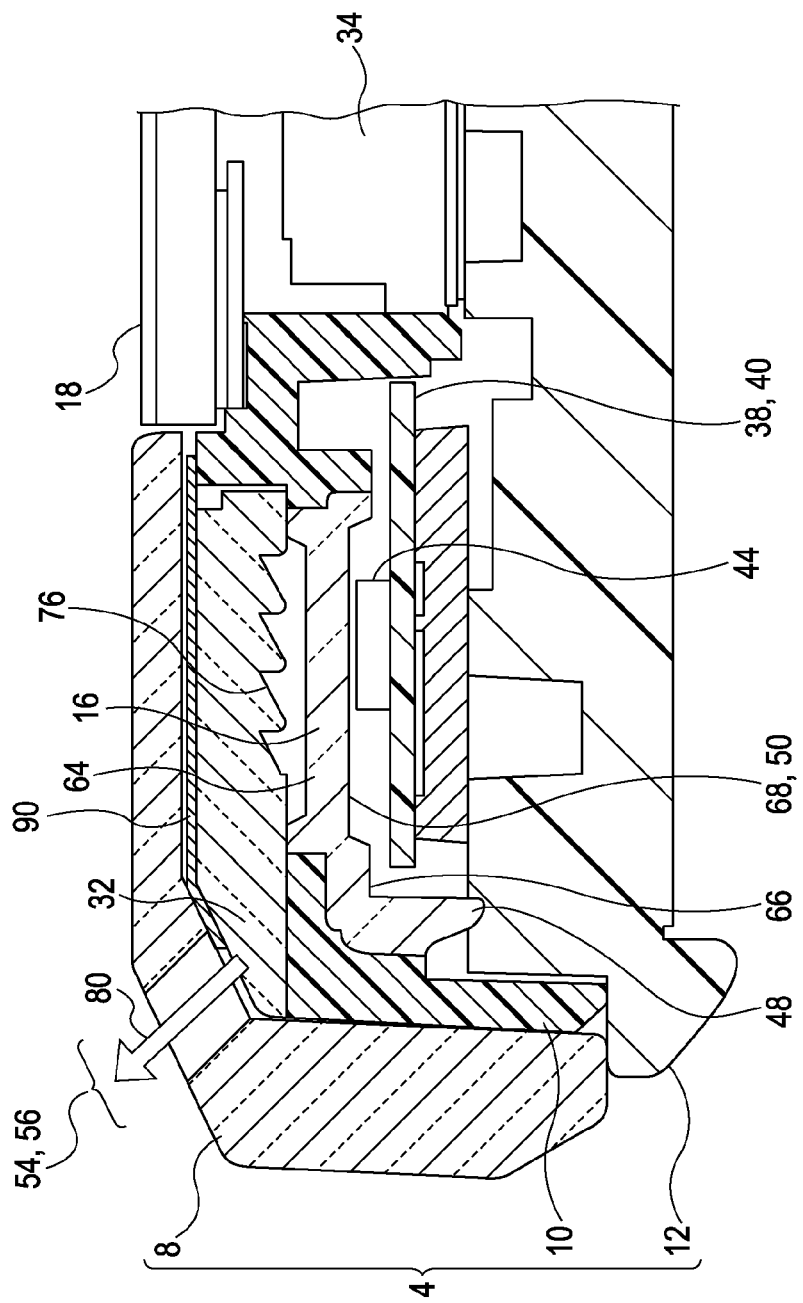
FIG. 17 illustrates an example cross-section of one of LEDs and the periphery thereof.
Figure 18:
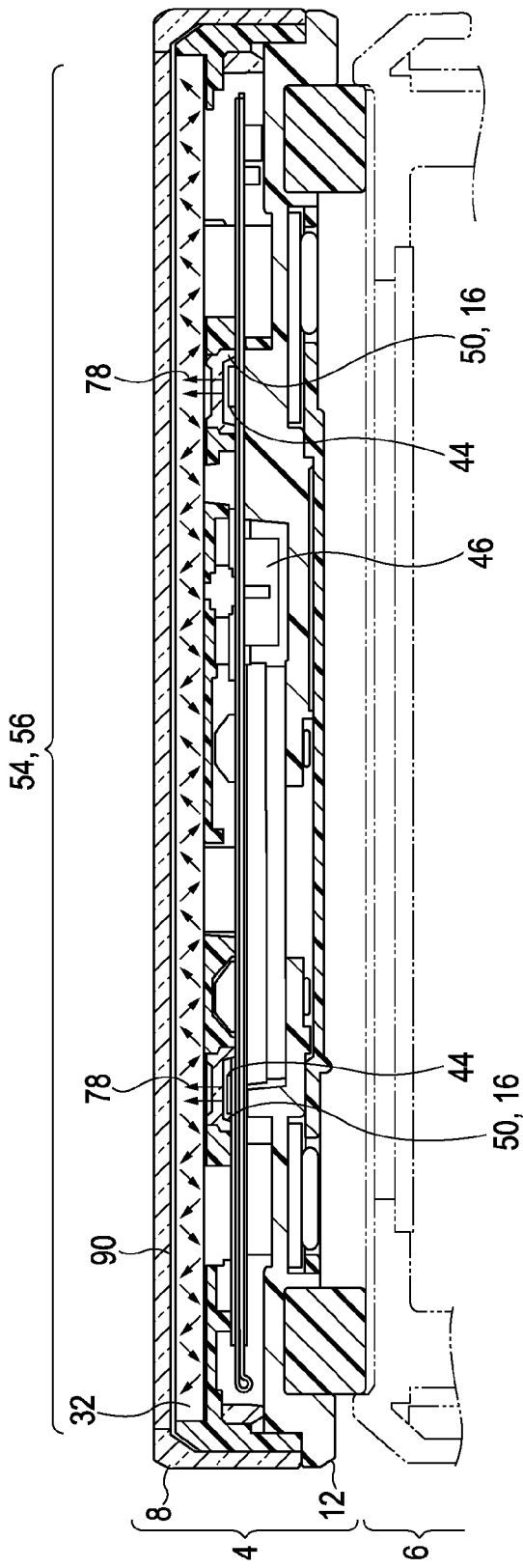
FIG. 18 illustrates an example light guiding state.

A second embodiment will be described below with reference to FIGS. 16, 17, and 18. FIG. 16 illustrates an example configuration of the movable front case 10 and the peripheral components according to the second embodiment. FIG. 17 illustrates an example cross-section of one of the LEDs 44 and the periphery thereof. FIG. 18 illustrates an example light guiding state. The configurations illustrated in FIGS. 16 to 18 are merely examples and are not limited thereto.

As described above, the grooves 60 are formed at both end section in the longitudinal direction of the movable front case 10, which is illustrated in FIG. 16, and the light guide members 32 are disposed therein. The light guide members 32 guide light that has transmitted through the windows 30 to the illumination windows 54 and 56 (FIG. 2) in the casing 4 (FIG. 2).

Light shield members 90 are disposed on the top side of the light guide members 32 on the movable front case 10. The light shield members 90 may be made of any material so long as light is not transmitted, is attenuated, or is absorbed; for example, black colored tape may be used as the light shield members 90.

In the case 4, which is illustrated in FIG. 17, the light transmitted through the window seal 50 of the elastomer 16 enters the light guide members 32 and, for example, is guided to the illumination windows 54 and 56 of the front cover 8 after being repeatedly reflected and diffused inside the light guide members 32. At this time, if part of the light that has reached the top side of the light guide members 32 is transmitted to the outside of the light guide members 32, the transmitted light is reflected or attenuated by the light shield members 90.

As described above, the front cover 8 covering the light guide members 32, for example, is colored or includes a colored member to reflect or attenuate light that has been transmitted through the light guide members 32 so that light is not transmitted through the front cover 8. The ability of blocking light depends on the type of color, the intensity of light, etc. Therefore, the type of color and pattern will be limited. By disposing the light shield members 90, as illustrated in FIG. 18, for example, light emitted from the front side of the front cover 8 can be blocked, and light can be emitted only from the illumination windows 54 and 56.

According to the above-described configuration, by using part of the water resistant unit as a light transmitting unit, light from a light source can be guided toward the light guiding unit on the casing 4 while maintaining the water resistant ability, and the number of component in the light emitting unit can be reduced. The visibility of the incoming alert lamp, etc. can be improved. By providing an oblique light unit, unwanted areas of the front cover 8 are not illuminated, and the light emitting unit will not be visible through the front cover 8 in an eye-ball like shape.

The advantages of the first and second embodiments will be described below.

(1) With the illumination structure of the electronic apparatus according to the present embodiment, by providing both a water resistant function by extending part of the water resistant elastomer and a light guiding function as a window formed in the casing, the number of member is reduced and a large area at the top and bottom of the display can be illuminated.

(2) With the electronic apparatus, since light is emitted from the external case, and a large area can be illuminated, the visibility of illuminated incoming call alerts and email reception alerts can be improved.

(3) With the electronic apparatus, for example, in a bicolor case, part of the water resistant elastomer is extended, a window for LED illumination is formed in the resin part of the end of the elastomer, and light guiding parts are mounted on the window. The water resistant elastomer may be made of translucent material. In this way, a wanted area on the case can be illuminated.

(4) With the illumination structure, a large area on the upper and lower parts of the external case can be illuminated while maintaining the water resistant ability, the visibility of the incoming alert lamp, etc. can be improved, and product competitiveness can be increased.

Figure 19:
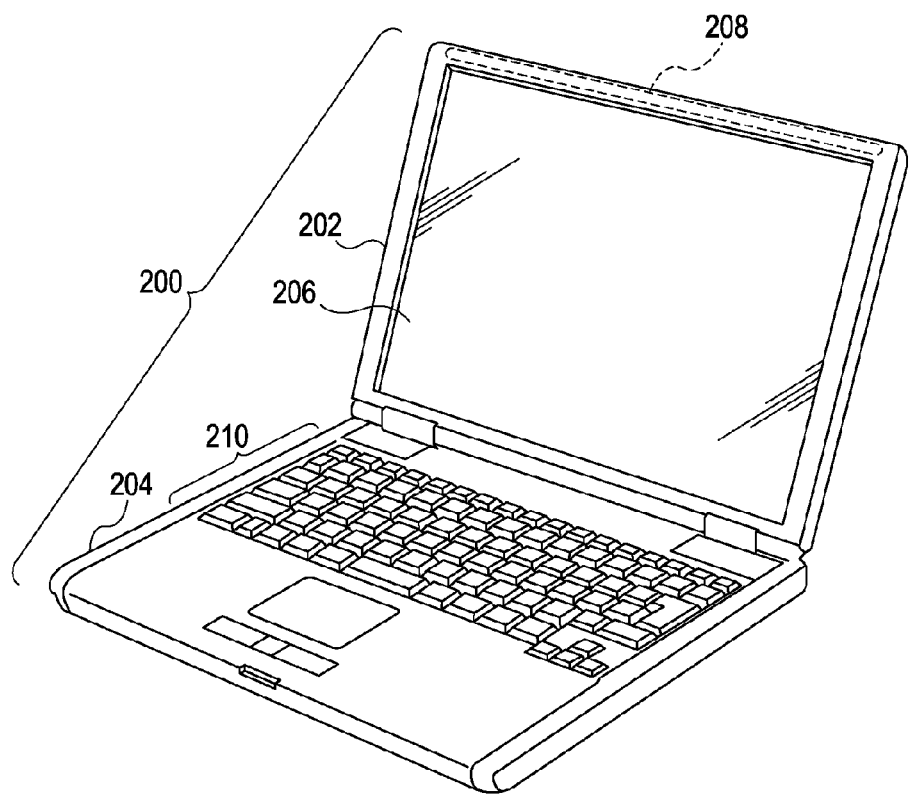
FIG. 19 illustrates an example configuration of a PC according to another embodiment.

Other Embodiments (1) In the embodiments described above, a mobile phone is described as an example of an electronic apparatus. The example, however, is not limited thereto, and, as illustrated in FIG. 19, a personal computer (PC) 200 including a first casing 202 and a casing 204 may be used. The casing 202 includes a display 206 and an illumination window 208. The casing 204 includes an input operating unit 210, such as a keyboard. The illumination window 208 may be illuminated by disposing a water resistant elastomer and a light guide member in the casing 202, as described above.

Another example of an electronic apparatus includes portable game devices and personal digital assistances (PDAs) to which a plurality of casings is slidably connected.

(2) In the embodiments described above, as the space between the light guide members 32 and the elastomer 16, the depressions 68 are formed in the window seal 50 of the elastomer 16. This, however, is not limited thereto and, instead, for example, the depression may be formed in the oblique-light diffusing part 76 of the light guide member 32. Moreover, depressions may be formed in both the light guide members 32 and the elastomer 16.

(3) In the embodiments described above, a casing in which an illumination structure including the elastomer 16, which is a water inhibitor, and the light guide members 32 is included in the casing 4. The illumination structure may instead be included in the casing 6.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An electronic apparatus comprising:
   a light source;
   a casing that accommodates the light source and includes a first window configured to pass light derived from the light source and a second window;
   a water inhibitor that is formed from a circumferential wall and a window seal in a monoblock form, the circumferential wall being disposed along an inner circumference of the casing and inhibiting invasion of water from the circumference of the casing into the casing, the window seal being disposed inside the first window such that the window seal substantially covers the first window, the window seal inhibiting invasion of water from the first window into the casing while allowing the light from the first window to pass outside of the casing; and
   a light guide member that is disposed over the first window and guides the light passing through the first window, wherein an outer part of the casing includes a groove configured to accommodate the light guide member; and the second window is configured to pass the light, wherein the light guide member connects the first window and the second window and at least part of the light guide member between the first window and the second window passes the light.

2. The electronic apparatus according to claim 1, wherein, the casing includes a cover member made of light transmissive material and covering the light guide member, wherein the cover member includes an illumination window through which the light guided in the light guide member passes.

3. The electronic apparatus according to claim 1, further comprising:
   a light shield member for blocking the light provided on part of the circumference of the light guide member.

4. The electronic apparatus according to claim 1, further comprising:
   protrusions and depressions provided on at least part of an incident surface of the light guide member, the light passing through the first window incident to the incident surface.

5. The electronic apparatus according to claim 1, wherein,
   a depression is provided in at least one of the window seal and the light guide member, and
   a space is interposed between the light guide member and the window seal.

6. An electronic apparatus comprising:
   a light source;
   a casing that surrounds the light source and has a first window configured to pass light derived from the light source and a second window;

a water inhibitor that includes a circumferential wall disposed along the inner circumference of the casing and a window sealing part that is disposed inside the first window such that the window sealing part substantially covers the first window, the water inhibitor being configured to inhibit invasion of water into the casing and allow light to pass through the first window and the window sealing part, the water inhibitor being formed from the circumferential wall and the window sealing part in a monoblock form; and a light guiding member that is disposed on an outer part of the casing and guides the light from the first window, wherein an outer part of the casing includes a groove configured to accommodate the light guiding member: and the second window is configured to pass the light, wherein the light guiding member connects the first window and the second window and at least part of the light guiding member between the first window and the second window passes the light.

\* \* \* \* \*